United States Patent [19]
Klymyshyn et al.

[11] Patent Number: 5,825,257
[45] Date of Patent: Oct. 20, 1998

[54] GMSK MODULATOR FORMED OF PLL TO WHICH CONTINUOUS PHASE MODULATED SIGNAL IS APPLIED

[75] Inventors: David M. Klymyshyn; Surinder Kumar; Abbas Mohammadi, all of Saskatoon, Canada

[73] Assignee: Telecommunications Research Laboratories, Edmonton, Canada

[21] Appl. No.: 877,772

[22] Filed: Jun. 17, 1997

[51] Int. Cl.$^6$ ................................................. H04L 27/12
[52] U.S. Cl. ........................ 332/100; 332/127; 375/274; 375/305
[58] Field of Search .................................. 332/100, 101, 332/102, 127; 375/274, 305

[56] References Cited

U.S. PATENT DOCUMENTS

| | | | |
|---|---|---|---|
| 5,022,054 | 6/1991 | Wang | 375/305 |
| 5,090,026 | 2/1992 | Stern et al. | 375/274 |
| 5,175,514 | 12/1992 | Iinuma et al. | 332/103 |
| 5,225,795 | 7/1993 | Iinuma | 332/100 |
| 5,425,055 | 6/1995 | Blaker | 375/279 |
| 5,467,373 | 11/1995 | Ketterling | 375/327 |
| 5,557,643 | 9/1996 | Kim et al. | 375/324 |

OTHER PUBLICATIONS

GMSK Modulation for Digital Mobile Radio Telephony, K. Murota, K. Hirade, IEEE Transactions on Communications, vol. COM–29, No. 7, Jul. 1981, pp. 1044–1050.

Advances in Constant Envelope Coded Modulation, J.B. Anderson, C–E. W. Sundberg, IEEE Communications Magazine, Dec. 1991, pp. 36–45.

Differential Detection of Gaussian MSK in a Mobile Radio Envionment, Marvin K. Simon, Charles C. Wang, IEEE Transactions on Vehicular Technology, vol. VT–33, No. 4, Nov. 1984, pp. 307–320.

Digital Transmission Systems, D.R. Smith, USA, Van Nostrand Reinhold Co., 1985, pp. 270–275.

Performance of GMSK with two–bit differential detection in a land mobile radio channel, Prabodh Varshney, Surinder Kumar and J.E. Salt, Can. J. Elect. & Comp. Eng., vol. 19, No. 1, 1994, pp. 37–43.

Minimum–Shift Keyed Modem Implementations for High Data Rates, Rodger E. Ziemer and Carl R. Ryan, IEEE Comunications Magazine, Oct., 1983, pp. 28–37.

Directly Modulated VSAT Transmitters, Surinder Kumar, Microwave Journal, Apr. 1990, pp. 255–264.

The Art of Electronics, Second Edition, Paul Horowitz, Harvard University, Chapter 13, High Frequency and High–Speed Techniques, 1989, pp. 897–901.

*Primary Examiner*—Siegried H. Grimm
*Attorney, Agent, or Firm*—Ken J. Pedersen; Barbara S. Pedersen

[57] ABSTRACT

A Gaussian Minimum Shift Keying modulator that provides direct modulation of a carrier signal, produced by a single microwave high power voltage controlled oscillator. A continuous phase frequency shift keyed modulated signal with a modulation index of 0.5 is produced at the desired output frequency using a full 360 degree linear continuous phase modulator, controlled by a linear baseband signal that is the integral of the binary baseband information signal. This modulated signal is used as the reference signal for a phase locked high power voltage controlled oscillator. The phase locked loop provides frequency tracking and Gaussian spectral shaping to the modulated output signal.

22 Claims, 8 Drawing Sheets

GMSK MODULATOR FORMED OF PLL TO WHICH CONTINUOUS PHASE MODULATED SIGNAL IS APPLIED

FIELD OF THE INVENTION

This invention relates to microwave modulators.

BACKGROUND OF THE INVENTION

This invention finds use in microwave radio communication systems. More specifically, the invention is used in radio communication transmitters employing Gaussian Minimum Shift Keying (GMSK) modulation. GMSK is a spectrally efficient modulation method and belongs to the family of constant envelope Continuous Phase Modulation (CPM) signals in which only the carrier phase is modulated. Minimum Shift Keying (MSK) is equivalent to continuous phase frequency shift keying (CPFSK) with a modulation index of 0.5. Because it is a frequency modulated (FM) signal, the MSK modulated signal has constant envelope, and thus, is fairly insensitive to transceiver nonlinearity which gives rise to modulated signal amplitude and phase distortion. The spectral side lobes of the MSK modulated signal roll off rather slowly. Thus, it is not a feasible modulation method in the radio environment, where out of band radiation and adjacent channel interference are strictly controlled. A premodulation Gaussian low pass filter is generally used to smooth the sharp phase transitions and filter the out of band power. The Gaussian filter response is appropriate for this purpose as it nearly maintains the constant envelope property and preserves the pattern-averaged phase-transition trajectory, enabling coherent detection. Thus, GMSK is a suitable modulation choice for many applications in the radio environment, due to desirable properties such as its relatively compact spectrum and detection capability using coherent or noncoherent methods.

The traditional method of generating GMSK is to modulate a voltage controlled oscillator (VCO) with the incoming serial data stream, correctly scaled in amplitude for a modulation index of 0.5 and low pass filtered by the Gaussian spectral shaping filter. In practice, frequency drift in the VCO makes this method impractical for most radio applications. Alternatively, a parallel form for MSK modulation can be derived which is equivalent to offset quadrature phase shift keying (OQPSK) modulation with sinusoidal baseband pulse shaping. Since quadrature carriers are phase modulated, the output modulated signal is stable in frequency. This method of MSK generation, however, is less appropriate than serial generation for high data rates and high carrier frequencies due to difficulties in maintaining inphase and quadrature (I/Q) amplitude and phase balance. Also, it is difficult to apply the Gaussian spectral shaping filter at baseband.

Direct digital modulation is a method by which the amplitude, phase, or frequency of a sinusoidal carrier is modulated directly by the baseband information sequence, as opposed to the more conventional method of modulation at an intermediate frequency (IF) and upconversion to the desired radio frequency (RF) transmit frequency. Direct modulation at microwave frequency is a very attractive option for reducing the cost and complexity of the transmitter, since it removes the requirement for IF and upconversion circuitry. Also, if the carrier produced by a single microwave power device is directly modulated at the desired transmit level, the requirement for a high power amplifier (HPA) as the final stage in the transmitter is removed.

SUMMARY OF THE INVENTION

The present invention describes a novel architecture for performing direct GMSK modulation of a microwave carrier signal.

Therefore, according to a first aspect of the invention, there is provided a modulator which comprises a source of a continuous phase modulated signal, in which the continuous phase modulated signal carries a baseband information signal; a voltage controlled oscillator having an oscillator output and a voltage control port; a coupler on the oscillator output; and a phase difference detector having a first input connected to the source of a continuous phase modulated signal, a second input connected to the coupler and an output connected to supply a voltage error signal to the voltage control port, whereby the voltage controlled oscillator and the phase difference detector form a phase locked loop and wherein the voltage error signal has a voltage proportional to an instantaneous phase difference between the continuous phase modulated signal and a signal appearing at the oscillator output.

In a further aspect of the invention, to generate the continuous phase modulated signal, an MSK modulated carrier signal is generated at the desired output microwave transmit frequency using a method of indirect frequency modulation (FM) from phase modulation (PM). Preferably, a continuous phase frequency shift keying (CPFSK) modulator is realized by integrating the binary baseband modulation signal and using this integrated baseband signal to perform continuous phase modulation (CPM) on the carrier. This combined operation of baseband integration and CPM modulation is equivalent to CPFSK.

In a further aspect of the invention, the source of a continuous phase modulated signal, such as the CPFSK modulator, is comprised of a voltage controlled phase shifter, for example a linear, fractional range CPM modulator with a xN frequency/phase multiplier, where N is an integer and a baseband modulation generator. The fractional CPM modulator preferably has a phase shift range of $2\pi/N$ radians. The factor N is chosen to relax the linear phase shift requirement of the fractional CPM modulator to a portion of the full $2\pi$ radian range that is realizable in hardware. In this aspect of the invention, a stable subharmonic reference signal, at 1/N times the carrier frequency, is injected into the fractional CPM modulator and the phase of the reference signal is modulated continuously over a $\pm\pi/N$ radian range. This provides a CPFSK modulated output signal at 1/N times the carrier frequency with a modulation index of 0.5/N. The baseband modulation generator provides the integration function to the binary baseband information signal. The modulation generator produces the modulating signal for the fractional CPM modulator, with the slope set to provide a modulation index of 0.5/N at the output. The modulation generator employs memory to account for phase wrapping at the $\pm\pi/N$ radian boundaries. The fractional CPFSK signal is input to a xN frequency/phase multiplier which translates the modulated subharmonic reference signal to the desired output frequency and restores the modulation index of the modulated output signal to that of MSK (0.5).

In a further aspect of the invention, the phase locked loop preferably incorporates a filter for spectral shaping of the oscillator output signal to a pre-determined frequency spectrum, preferably that of a Gaussian minimum shift keyed spectrum. The phase locked loop allows the voltage controlled oscillator to frequency track the continuous phase modulated signal, while providing Gaussian filtering to convert the input signal spectrum to a GMSK modulated signal spectrum at the voltage controlled oscillator output. The voltage error signal output from the phase locked loop is the recovered baseband binary information sequence, with premodulation Gaussian filtering, and directly controls the frequency of the output high power voltage controlled oscillator to maintain phase lock to the continuous phase modulated signal, and realize frequency tracking. The Gaussian spectral conversion function is realized as a combination of the loop low pass filter response, the loop gain, any variable gain block in the phase locked loop, and the feedback in the phase locked loop.

As a result of the feedback in the phase locked loop, the filter response is not the same as the desired Gaussian filter response, but is modified since the phase locked loop provides a pole to the overall loop response. The desired Gaussian filter response, and thus the loop filter response, is approximated as an all poles polynomial function.

In a further aspect of the invention, a frequency divider is provided in the feedback path of the phase locked loop. The frequency divider is used to reduce the peak phase detector error from the nonlinear portion of the sinusoidal phase detector characteristic. When a frequency divider is used in the feedback path, the waveforms of the baseband modulation generator may require modification.

This invention presents a novel and elegant hardware architecture for effectively realizing direct GMSK modulation of a high power oscillator at microwave frequencies. No upconversion to the desired RF transmit frequency is required, nor is an HPA on the transmitter output required, since a high power VCO is directly modulated at the transmit frequency. The GMSK modulated RF carrier is stable in frequency, since the power VCO is phase locked to a stable reference signal. The benefits of this new implementation include:

a. Simplified, cost effective hardware architecture, requiring no upconversion or output amplification circuitry.

b. Use of a subharmonic frequency reference signal, which is easier to obtain than the microwave output carrier.

c. Modulated microwave output carrier which is stable in frequency.

d. Simplified Gaussian spectral shaping filter.

Very few components are required to implement this invention at microwave frequency, which makes it attractive for many applications.

These and other aspects of the invention are described in the detailed description of the invention and claimed in the claims that follow.

DETAILED DESCRIPTION OF PREFERRED EMBODIMENTS

Figure 1:
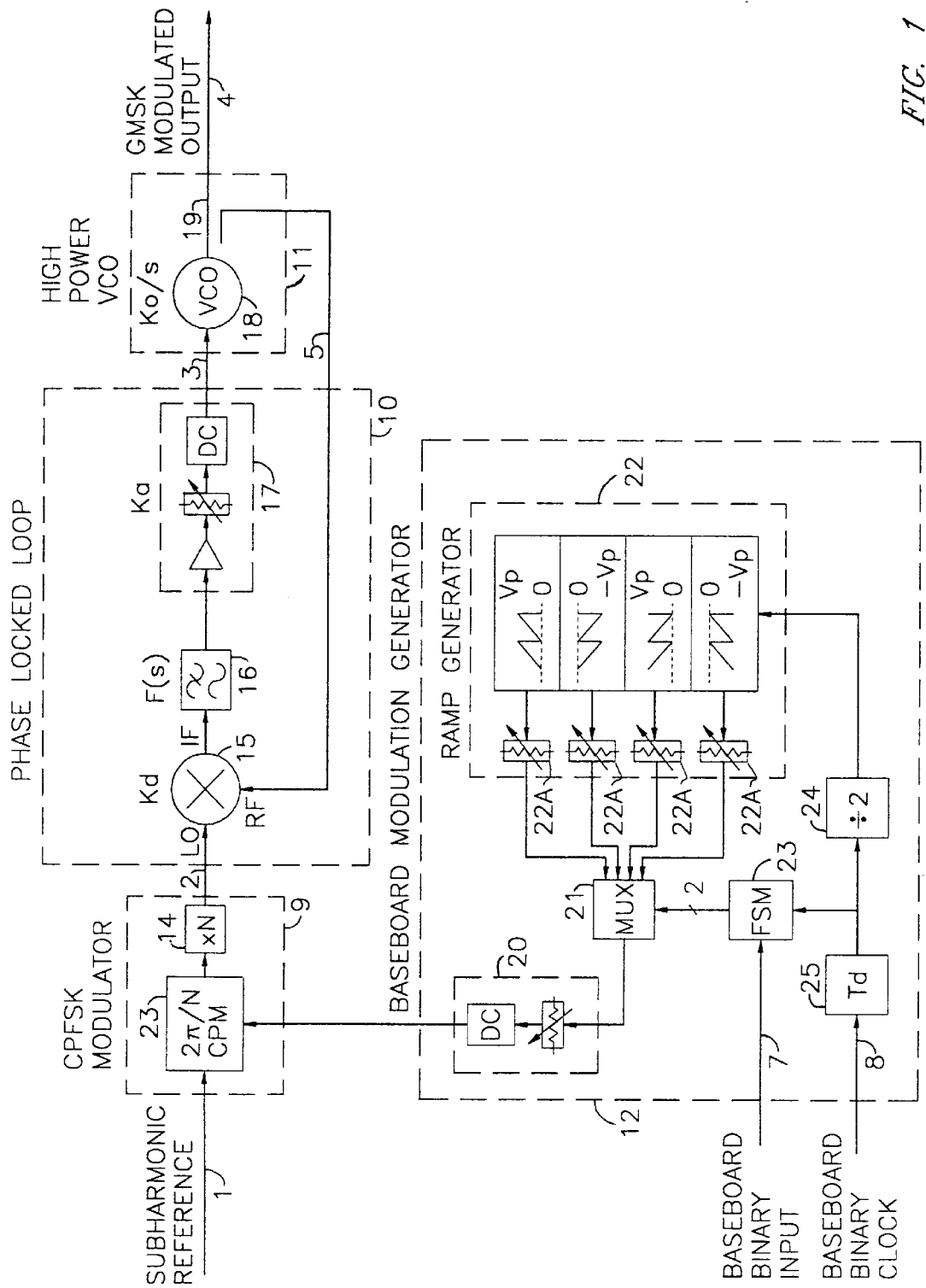
FIG. 1 is a functional block diagram of a direct GMSK modulator according to the invention, comprised of a CPFSK modulator, a baseband modulation generator, a phase locked loop, and a high power oscillator.

The functional block diagram of the direct GMSK modulator is shown in FIG. 1, and is referred to throughout this section. In this patent document, microwave is taken to mean the range of frequencies from 1–100 GHz although it will be appreciated that the utility of the invention in higher frequencies is only limited by the present availability of components, and not by the principle of operation of the invention.

A source of a continuous phase modulated signal is formed by a CPFSK modulator 9 and a baseband modulation generator 12. An exemplary CPFSK modulator 9 is described below in relation to FIGS. 4–6, and is the subject of Canadian patent application no. 2,202,457 filed Apr. 11, 1997, and a U.S. application Ser. No. 08/843,970, filed Apr. 17, 1997.

Figure 4:
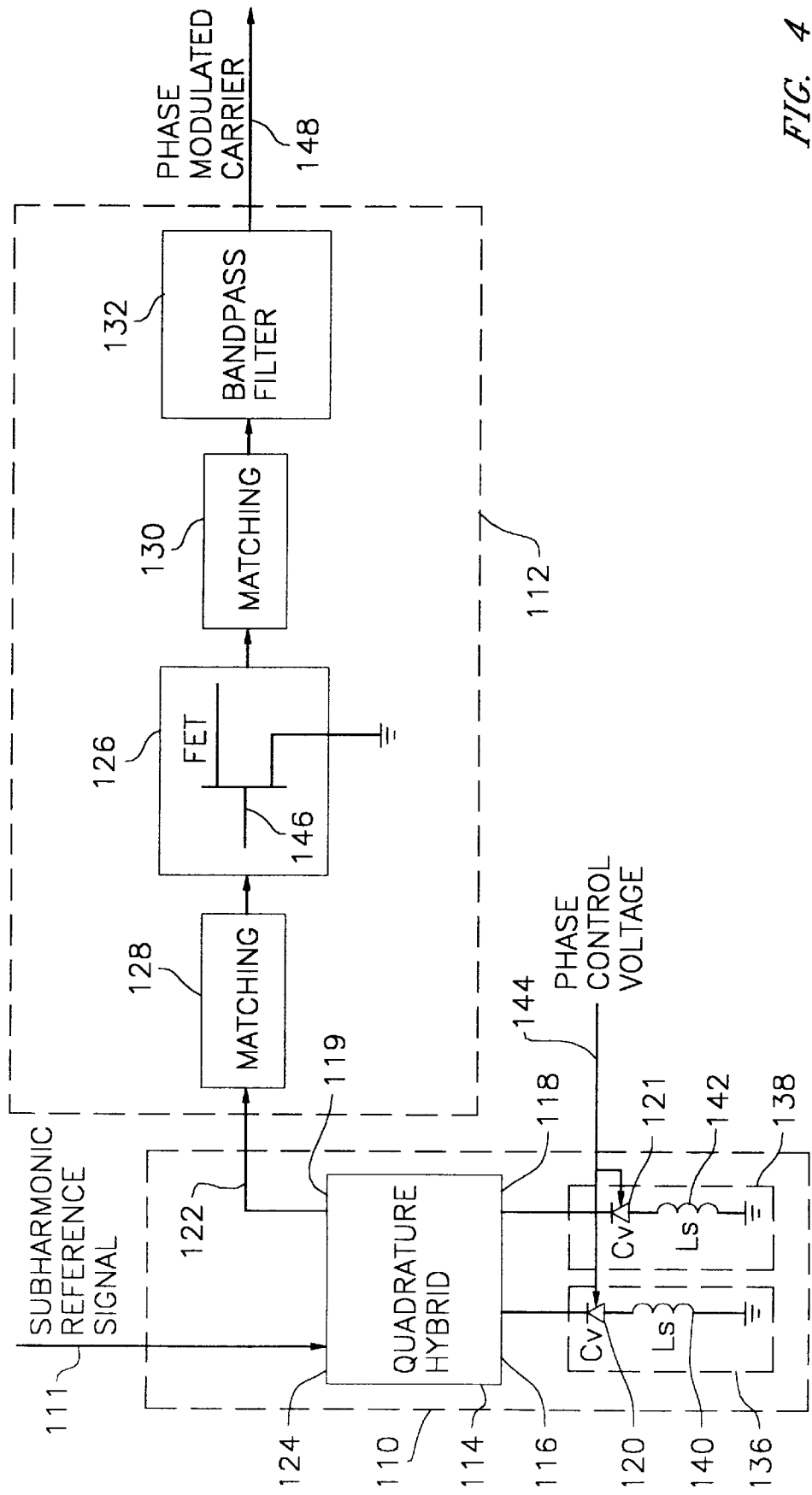
FIG. 4 is a functional block diagram of the 360 degree linear phase shifter used as the CPFSK modulator in a preferred implementation of the invention.
Figure 5:
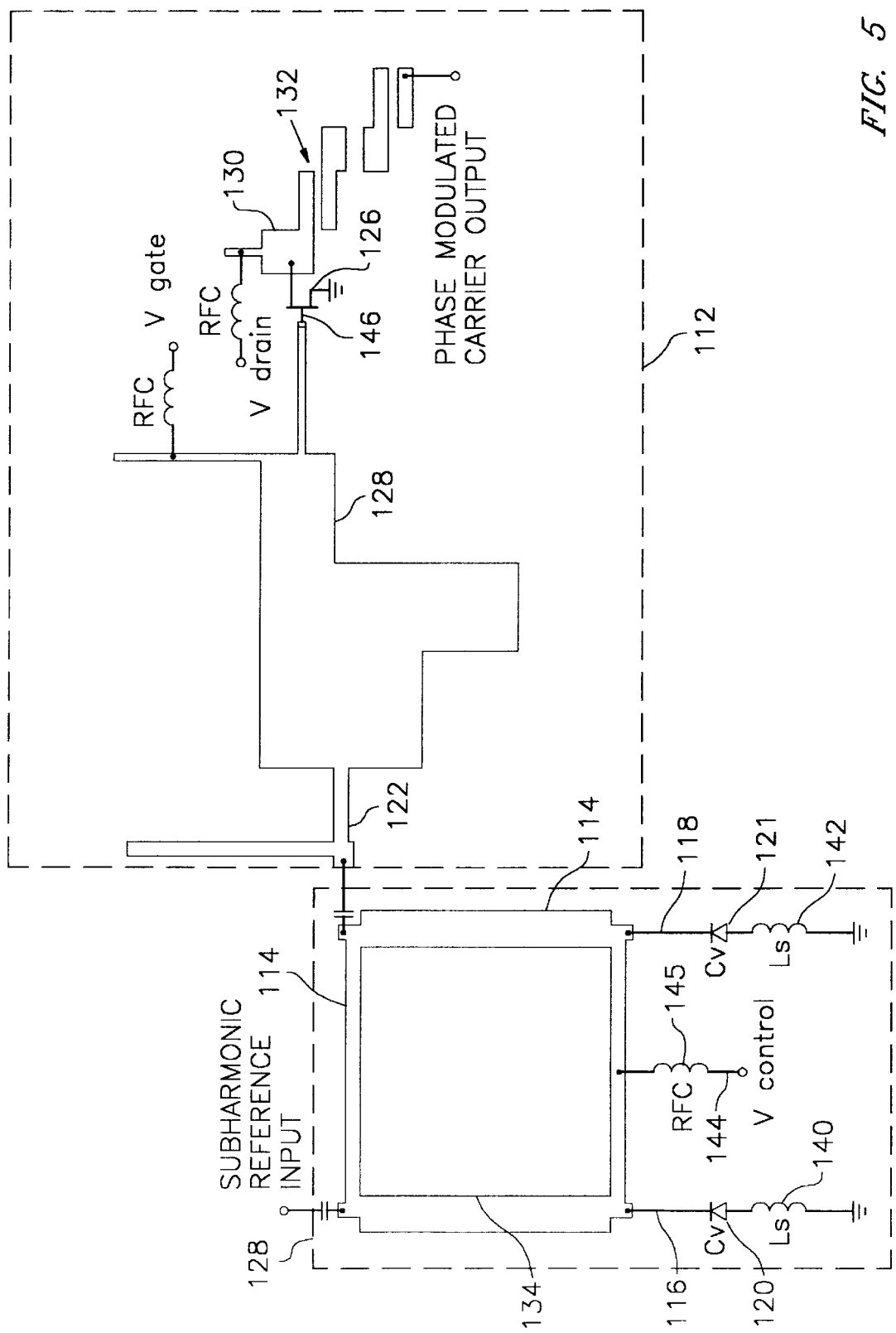
FIG. 5 is a microstrip schematic for the 360 degree linear phase shifter of FIG. 4.
Figure 6:
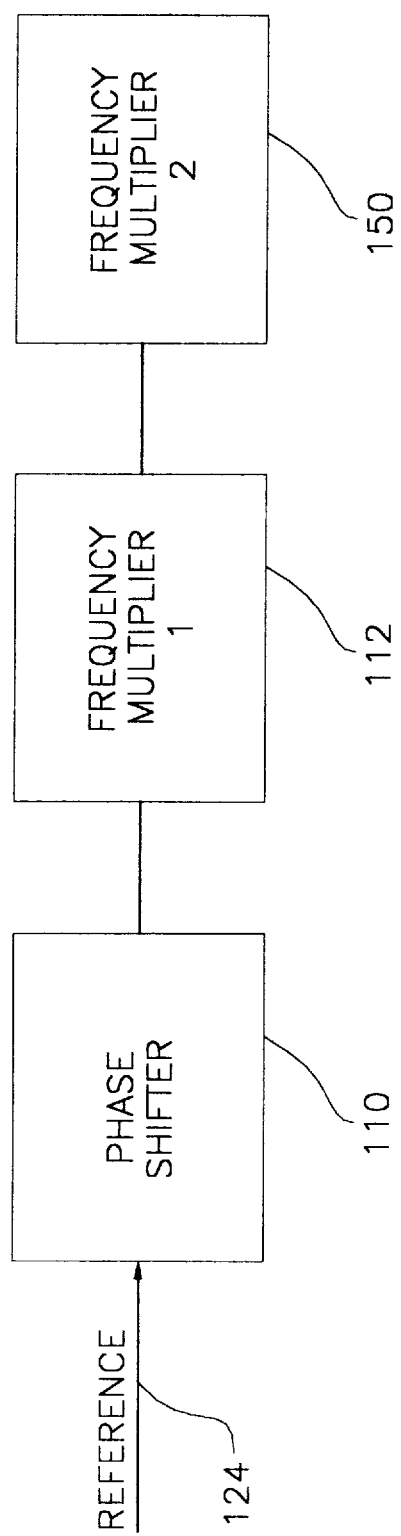
FIG. 6 is a functional block diagram showing an implementation of the microwave phase shifter with multiple multiplier stages.

A continuous wave (CW) subharmonic reference signal 1, at 1/N times the desired microwave output carrier frequency, is input to the linear CPFSK modulator 9. A fractional range CPM modulator 13 provides a continuously variable linear phase shift to the subharmonic reference signal in the range $\pm\pi/N$ radians. The phase shift of the CPM modulator 13 is proportional to a control voltage 6 that is generated by the baseband modulation generator 12. The maximum phase shift from the CPM modulator 13, $+\pi/N$ radians, corresponds to the maximum control voltage 6, $V_{max}$, and the minimum phase shift from the CPM modulator 13, $-\pi/N$ radians, corresponds to the minimum control voltage 6, $V_{min}$. If the fractional CPM modulator 13 is realized as a reflection type varactor terminated phase shifter, as shown in FIGS. 4–6, then the control voltage 6 represents the bias voltage on the reverse biased varactor diodes. In this situation, the control voltage has a DC bias to maintain the varactors in a reverse biased configuration, and in excess of the diode contact potential. The DC bias is such as to provide nominal phase shift through the CPM modulator 13 at $(V_{max}+V_{min})/2$, corresponding to the middle of the varactor capacitance versus voltage (CV) characteristic. The output signal from the CPM modulator 13 is a fractional CPFSK modulated output signal at 1/N times the carrier frequency with a modulation index of 0.5/N. The fractional range CPFSK signal is input to a xN frequency/phase multiplier 14 which translates the modulated subharmonic reference signal to the desired output frequency. The multiplier 14 multiplies the instantaneous input phase by a factor of N, which restores the modulation index of the modulated output signal to that of MSK (0.5). The multiplier 14 also contains output termination circuitry, to maintain all undesired spurious harmonic signals at acceptable levels, and gain to provide an output signal with adequate level to drive a local oscillator (LO) input of the phase difference detector 15 in phase locked loop 10. The CPFSK modulator 9 output signal 2 is an MSK modulated carrier at the desired output frequency. This signal is fed to the phase locked loop 10 and drives the phase difference detector 15.

The linear CPFSK modulator 9 output phase is controlled by the modulation control voltage 6 that is generated by the baseband modulation generator 12. The baseband modulation generator 12 accepts a baseband binary information signal (data) 7 and a recovered baseband binary information signal clock (clock) 8 and performs integration to produce the modulation signal 6 as required in conventional indirect FM. The clock signal 8 is a binary signal at a rate $1/T_b$ Hz, where $T_b$ is the bit period of the input data signal 7. The clock is delayed slightly as shown at delay block 25 to provide adequate timing margin with respect to the data signal transition times.

Figure 3B:
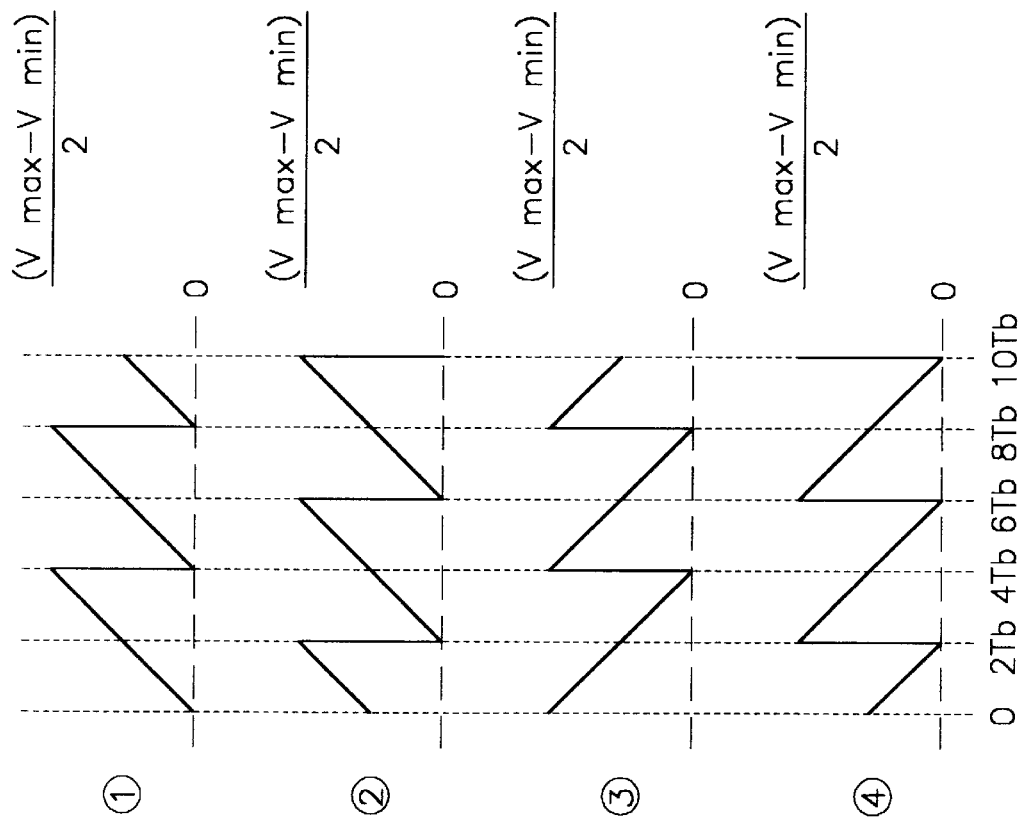
FIGS. 3B and 3C show sample sawtooth waveforms for use in the modulator of FIG. 2.
Figure 3A:
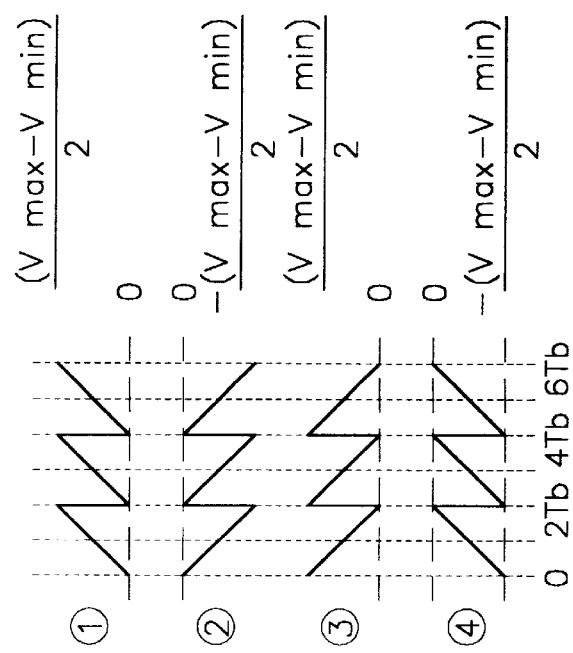
FIG. 3A shows sample sawtooth waveforms for use in the modulator shown in FIG. 1.

The delayed clock signal is input to a clocked synchronous finite state machine (FSM) 23. The delayed clock frequency is divided by two in divider 24 and fed to a ramp generator 22 at a rate $\frac{1}{2}T_b$ Hz. The ramp generator 22 uses the half rate clock signal to synchronise the generation of various sawtooth waveforms with a period of twice the data bit period or $2T_b$. Four separate sawtooth waveforms are generated by the ramp generator 22 with a period of $2T_b$ and a slope of $\pm(V_{max}-V_{min})/4T_b$. The slope of the sawtooth waveforms can be controlled independently in the four channels by adjusting variable attenuators 22A in these channels to set the peak values of the waveforms. The sawtooth waveforms are shown in FIG. 3A.

This method of generating four sawtooth waveforms at a period of $2T_b$ provides eight possible modulation signals when the sawtooth waveforms are sampled at the bit period, $T_b$. The eight modulation signals represent either a continuous increase or continuous decrease of $\pi/2N$ radians over the bit period in the fractional range CPM modulator 13 or $\pi/2$ radians in the MSK modulated output signal from the CPFSK modulator 9. All eight modulation signals are required to represent all possible phase transitions in output excess phase. A fast switching analog multiplexer (MUX) 21 is used to select 1 of 4 sawtooth signals at a rate of $1/T_b$ Hz. The switching speed of the multiplexer 21 is such that the response time of the phase locked loop 10 is slow compared to the settling time of the multiplexer 21 at the $\pm\pi$ discontinuity in the modulated output signal excess phase (discontinuity in the fractional range CPM modulator 13 control signal is from $V_{max}$ to $V_{min}$). This is required so the phase locked loop 10 does not errantly track the MSK modulated input signal 2 during phase wrapping at the phase discontinuity.

The multiplexer 21 selects 1 of 8 ramp modulation signals, since the sawtooth waveforms are two times oversampled. The clocked synchronous finite state machine 23 has two output control lines, synchronous to the delayed input clock, which control the multiplexer 21 in selecting the sawtooth signals. The finite state machine 23 samples the input data signal 7 and selects the appropriate ramp modulation signal based on the current phase trajectory of the modulated output signal excess phase. The manner in which the finite state machine 23 selects the ramp modulation signals from the baseband information signal is shown in Table 1, with reference to the ramp modulation signals 1–4 shown in FIG. 3A. The first entry in Table 1 corresponds to the initialization or t=0 state. The term "clockwise" in this table represents a continuous decrease in the modulated output signal excess phase and the term "counterclockwise" represents a continuous increase. The composite multiplexed phase modulation signal 6 out of the multiplexer 21 is scaled and DC biased at variable gain and DC bias block 20 to provide the appropriate $\pm\pi/N$ radian phase shift range out of the fractional range CPM modulator 13. The phase modulation signal 6 controls the CPFSK modulator 9.

The MSK modulated signal output from the CPFSK modulator 9 is injected at 2 into a phase locked loop 10 centred at the desired output microwave transmit frequency. This signal provides the LO signal for a phase difference detector or mixer 15, that has DC response at the IF output port. The input signal from feedback path 5 to the radio frequency port, labelled RF, of the phase difference detector 15 is the GMSK modulated voltage controlled oscillator 11 output signal, sampled by a coupler 19 on the VCO output. The coupling value of the coupler 19 is chosen to provide an RF input level to the phase difference detector 15 that is comparable to the LO input level. The use of a large signal RF input signal provides natural hard-limiting and results in the mixer IF output being proportional to the phase difference in the LO and RF input signals, and insensitive to slight amplitude variation in the GMSK modulated output signal.

The combination of LO-RF port isolation in the phase difference detector 15 and the output coupler 19 coupling value provides sufficient isolation in the feedback path 5 between the voltage controlled oscillator output 18 and the MSK modulated input signal 2 to prevent injection locking of the voltage controlled oscillator 18 to the MSK input signal. This would result in signal distortion and sidelobe regeneration in the GMSK modulated output signal.

In FIG. 1, there is no frequency divider in the feedback path 5, and minimal delay since the phase detector 15 and output coupler 19 are physically close. Minimizing delay provides better loop stability. The phase difference detector 15 compares the instantaneous phase of the input modulated carrier to that of the sampled output modulated carrier and produces a voltage error signal IF which is proportional, over the "linear" portion of the sinusoidal phase detector characteristic, to the phase difference, with constant of proportionality equal to $K_d$ volts/radian.

The signal IF is fed to a low pass filter (F(s)) 16 that rejects harmonic mixing products from the phase difference detector 15 and provides a modified Gaussian filter response. The effect of the low pass filter 16 together with the filter effect of the other components of the modulator is to provide spectral shaping of the oscillator output 4 as the desired Gaussian minimum shift keying output. The filter response itself is thus modified from the desired Gaussian response since the overall phase locked loop response is realized as a combination of the loop low pass filter response 16, the variable gain block 17, the phase difference detector 15, the voltage controlled oscillator 18 sensitivity, $K_o$ radians/second-volt, and the feedback 5 in the PLL. If the desired Gaussian filter response is approximated using a Taylor series expansion for $e^{2x}$, the desired filter approximation is a polynomial function of only poles.

The modified Gaussian filter response as a function of the Laplace transform variable, s, normalized to the bit period $T_b$ is (equation 1):

$$F(sT_b) = \frac{\sqrt{n!} \ (\sqrt{2} \ k)^{-n} \ (KT_b)^{-1}}{(sT_b)^{n-1} + \ldots + c_2 k^{3-n}(sT_b)^2 + C_1 k^{2-n}(sT_b) + c_0 k^{1-n}}$$

where $K=K_d K_o$, n is the order of the Taylor series expansion and (equation 2):

$$k = \frac{\sqrt{\ln 2}}{2\pi \sqrt{2} \ BT_b}$$

where $BT_b$ is the Gaussian filter 3 dB bandwidth normalized to the bit rate $T_b$. The modified Gaussian response denominator polynomial coefficients $c_i$ are shown in Table 2 as a function of Gaussian filter order.

The filter $F'(ksT_b)$ is the baseband low pass filter 16 and implements the denominator portion of the modified Gaussian filter response as (equation 3):

$$F'(ksT_b) = \frac{c_o}{(ksT_b)^{n-1} + \ldots + c_2(ksT_b)^2 + C_1(ksT_b) + c_0}$$

where n is the order of the power series. The variable gain block 17 ($K_a$) is used to adjust the phase locked loop open loop gain to match that required by the modified Gaussian filter response of equation 1 and provide the desired closed loop Gaussian filter response, as well as provide DC bias for the VCO voltage control signal. The nominal value of $K_a$ is (equation 4):

$$K_a = \sqrt{\frac{\pi^2 n!}{2^{n-3}\ln 2}} \ \frac{BT_b G_S G_D}{KT_b c_o}$$

where $G_S$ and $G_D$ are gain compensation factors for the sinusoidal phase detection characteristic and the excess loop delay.

A significant simplification in the baseband circuitry is obtained if the variable gain block, $K_a$, is restricted to be passive. In this case, the required loop gain, $KT_b$, must satisfy (equation 5):

$$KT_b > \sqrt{\frac{\pi^2 n!}{2^{n-3}\ln 2} \cdot \frac{BT_b G_S G_D}{c_o}}$$

to provide the necessary open loop gain.

In addition, the response of the baseband loop filter 16 of 4th order or lower polynomials results in the simplest baseband circuit solution and can be realized as a passive ladder circuit.

Exemplary low pass filter prototype values, $g_n$, for passive ladder circuits up to the 4th order (3rd order modified Gaussian) are shown in Table 3.

Exemplary impedance and frequency scaled values are (equations 6 and 7):

$$L' = \frac{LR_o T_b}{BT_b}$$

$$C' = \frac{CT_b}{R_o BT_b}$$

where L and C are the prototype inductance and capacitance values from Table 3 and $R_o$ is the characteristic impedance of the system.

The baseband output signal 3 from the gain block 17 is the desired GMSK modulation signal. This signal 3 is the voltage control signal for the high power voltage controlled oscillator 18. The high power VCO 18 operates at the desired microwave output frequency and level. The frequency stability of the voltage controlled oscillator 18 is such that drift in VCO frequency from the nominal input reference carrier frequency 2 does not shift the phase detector phase error signal into the severely nonlinear portion of the sinusoidal phase difference detector 15 characteristic. The output of the high power voltage controlled oscillator 11 is the desired directly modulated GMSK output signal 4 at microwave frequency.

Figure 2:
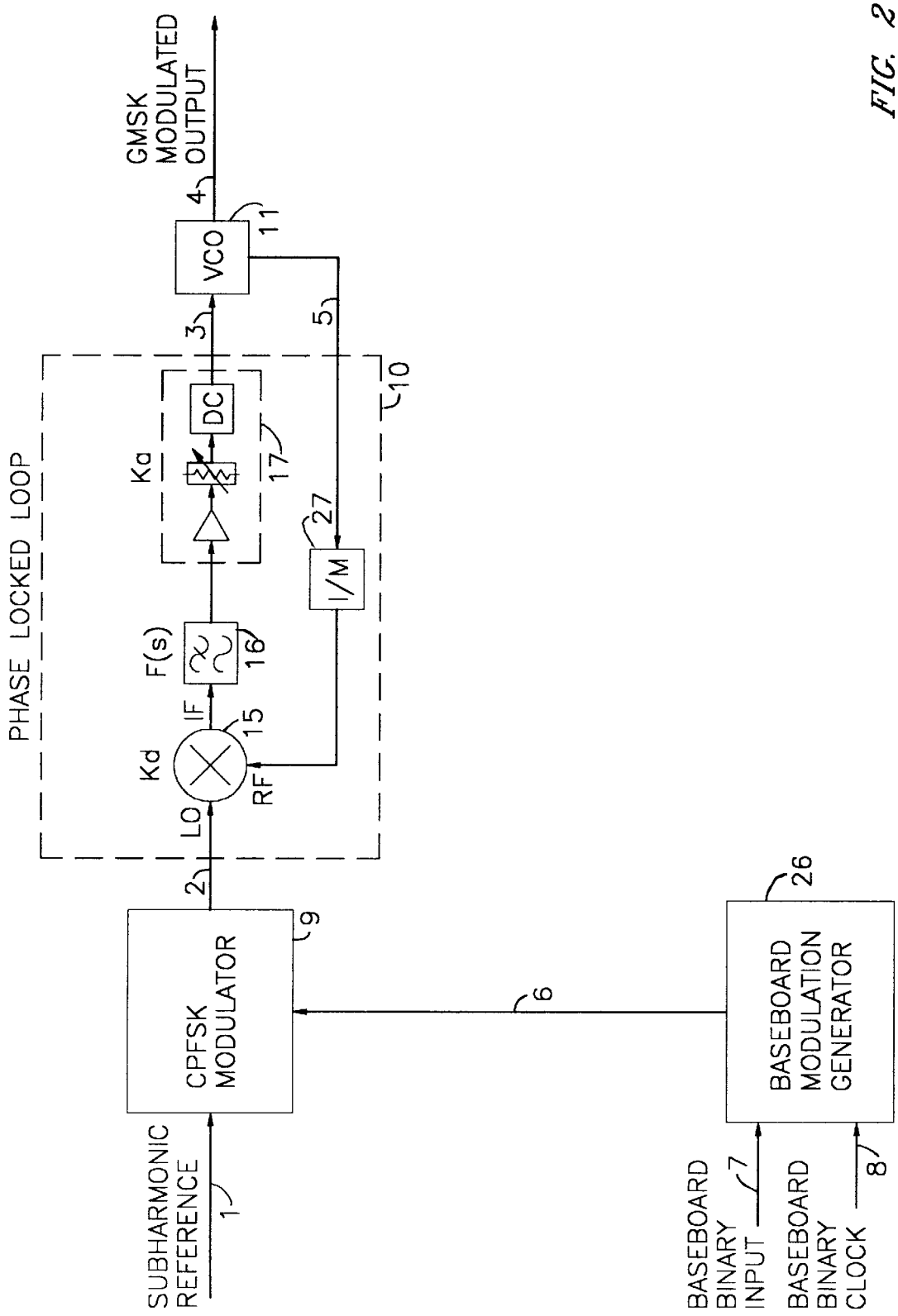
FIG. 2 is a functional block diagram of an embodiment of a direct GMSK modulator including a frequency divider in the feedback path of the phase lock loop.

An alternative implementation of the direct GSMK modulator is shown in FIG. 2. The gain correction factor, $G_s$, can only provide adequate compensation for combinations of Gaussian filter approximation order and $BT_b$ value which result in a loop DC tracking range that is comparable to the input signal peak frequency deviation. High order and/or low $BT_b$ value filter approximations cannot, generally, be realized using simple open loop gain correction to increase loop bandwidth as the loop bandwidth is substantially less than the input signal peak frequency deviation.

In these situations, a microwave frequency divider 27 with an integer frequency division factor of M, in the feedback path 5 of the phase locked loop 10 can be used to reduce the peak phase detector error from the highly nonlinear portion of the sinusoidal phase detector characteristic. The phase locked loop input reference signal 2 in this case is a CPFSK modulated signal at 1/M times the phase locked loop output frequency with a modulation index of 0.5/M. The loop gain constant, $K_a$, from loop gain block 17 must be multiplied by M, to maintain the desired closed loop Gaussian filter response, as (equation 8)

$$K_a = \sqrt{\frac{\pi^2 n!}{2^{n-3}\ln 2} \cdot \frac{BT_b G_S G_D M}{KT_b c_o}}$$

This also results in an increase in the DC tracking bandwidth by a factor of M. Table 4 provides exemplary values for the selection of Gaussian filter approximation order, $BT_b$ value, and feedback frequency divider for realizable loop implementations.

Figure 2A:
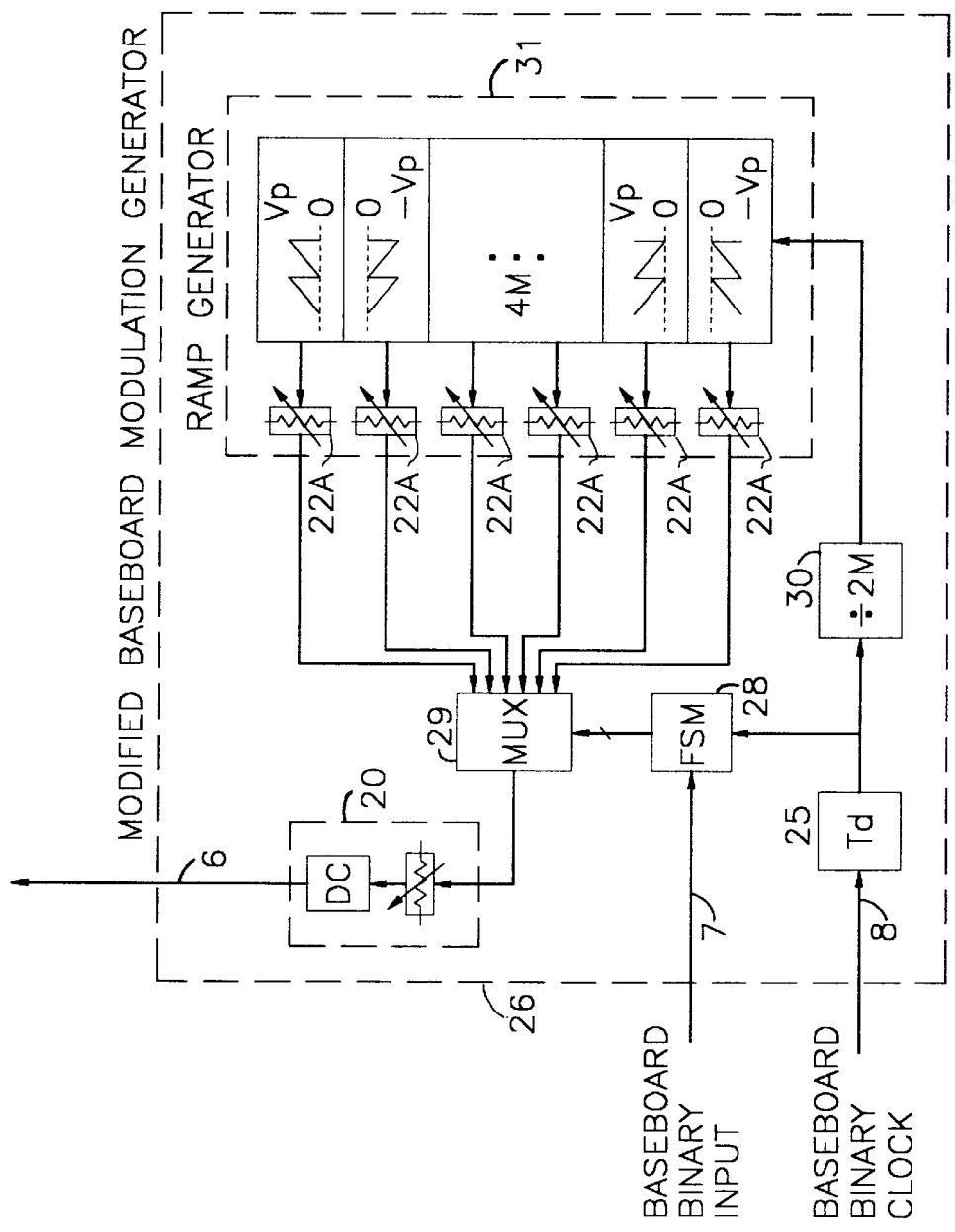
FIG. 2A is a functional block diagram of an embodiment of a baseband modulation generator for use in the embodiment of FIG. 2.
Figure 3C:
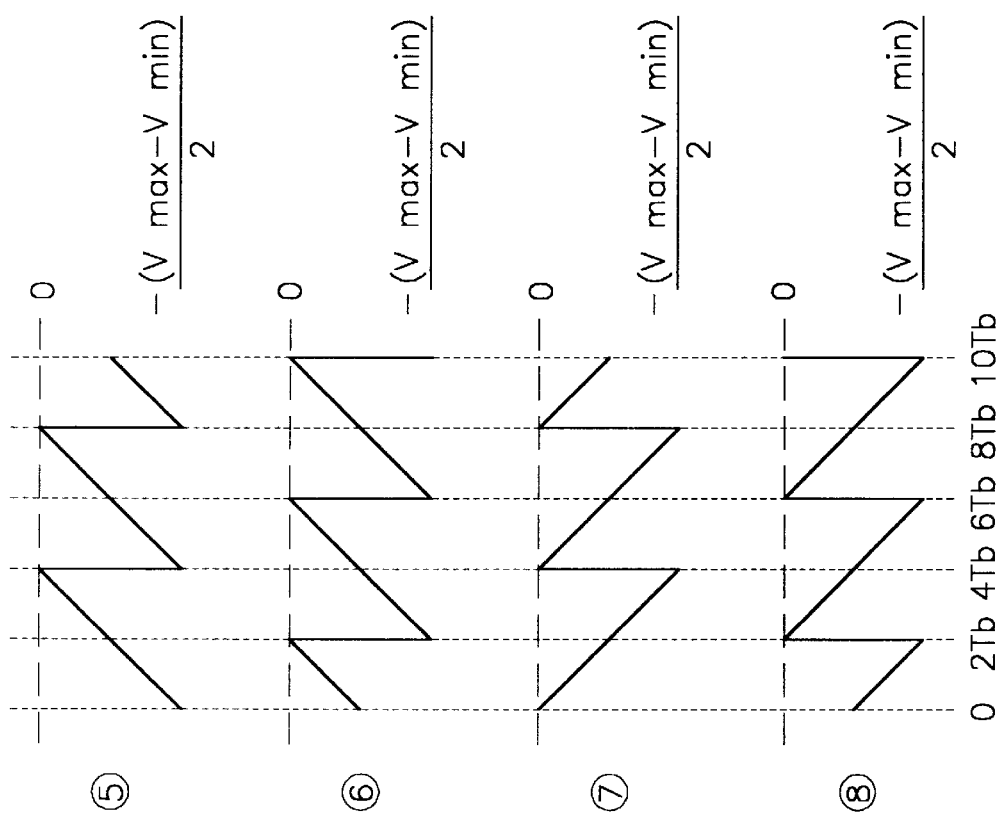

Inclusion of a frequency divider results in an increase in hardware complexity. In addition to the microwave frequency divider 27 that must be added, a more complicated baseband modulation generator 26 is required as shown in FIG. 2A. Functional blocks in FIG. 2A are the same as those shown in the baseband modulation generator 12 shown in FIG. 1, with the following modifications. Frequency divider 30 on the baseband binary clock path divides the frequency of the clock by 2 M. The number of sawtooth waveforms required increases from 4 to 4 M to realize all paths in the 0.5/M CPFSK output excess phase trellis. Otherwise, the sawtooth waveforms are generated in the same manner as shown in the ramp generator 31, including variable attenuators 22A. All of these sawtooth waveforms are input to multiplexer 29 in the same manner as shown in FIG. 1. The sawtooth waveforms are generated by the ramp generator 31 with a period of $2MT_b$ and a slope of $\pm(V_{max}-V_{min})/4MT_b$. These waveforms are 2 M times oversampled by the multiplexer 29 under control of finite state machine 28 to generate 8 M different output phase trajectories. Finite state machine 28 operates in the same manner as finite state machine 23 except for the increased sampling. Operation of the finite state machine 28 is illustrated in Table 5, which shows how the ramp waveforms (FIGS. 3B and 3C) are selected according to the output signal phase trajectory and the binary baseband data. Sample sawtooth waveforms for an M=2 divider 27 are shown in FIGS. 3B and 3C. In the state table for the finite state machine 28, for when M=2, two sets of states, for the 8 M=16 output phase trajectories, are required and are labeled A and B. These different states represent the same output phase trajectory, but are generated by selecting different sawtooth waveforms. The waveform selected depends on the current position in the output excess phase trellis relative to the current position in the sawtooth cycle. For example, waveform 1 from t=0 to t=$T_b$ (0→π/4 A) represents the same output phase trajectory as waveform 2 from t=$2T_b$ to t=$3T_b$ (0→π/4 B). Therefore, if this output phase trajectory is required at t=$2T_b$ to t=$3T_b$, waveform 2, or B state, should be selected. In general, the 8 M output phase trajectories are represented by 8 M×M=8 $M^2$ states to allow selection of the correct sawtooth waveform to represent the desired output phase trajectory at any point in time. Waveforms for higher dividers are generated in a similar fashion.

The CPFSK modulator 9 will now be described in more detail in relation to FIGS. 4–6. The CPFSK modulator 9 has two main functional elements. The first is a voltage controlled phase shifter 110 to which is operatively connected the second element which is a frequency multiplier 112 for receiving phase shifted signals from the voltage controlled phase shifter 110 and translating the phase shifted signals to a higher frequency, thus expanding the effective phase shift.

A subharmonic reference signal from source 111, at ⅕ of the carrier frequency or 3.6 GHz for the sample implementation, is injected into the voltage controlled phase shifter 110 at −12 dBm. The phase shifter 110 is preferably a linear fractional range reflection type varactor phase shifter. The phase shifter 110 is comprised of a microstrip quadrature hybrid coupler 114, with a direct port 116 and coupled port 118 terminated in the same variable capacitance series inductance, inductor/capacitor (LC), reactive terminations 136, 138. The quadrature hybrid 114 is not especially wideband, but is simple, and provides adequate bandwidth for the sample implementation. Other wideband couplers or circulators could also be used. The variable capacitance characteristic is provided via reverse biased varactor diodes 120, 121. With ideal reactive terminations, all power is reflected from the direct and coupled ports 116, 118 and combines constructively at the isolated port 119 of the coupler 114 with no loss. In practice, some loss occurs from parasitic resistance in the terminations. The phase shift through the hybrid coupler 114 is a function of the termination reactance, and thus, can be controlled by varying the bias voltage on the varactors 120, 121 and changing the series capacitance.

The reference signal enters the input port 124 of the microstrip quadrature hybrid coupler 114 and is reflected to the isolated output port 119 of the coupler 114 by equivalent reactive terminations 136, 138 on the direct and coupled ports 116, 118 of the coupler 114. The reactive terminations are comprised of grounded series inductors 140, 142 and series reverse biased varactor diodes 120, 121. The varactor diodes 120, 121 provide a variable capacitance characteristic by varying the reverse biased diode control voltage supplied at 144 through inductor 145 (FIG. 5). The total series inductance includes the parasitic series inductance of the varactor diodes 120, 121 and ground connections.

The varactor capacitance versus voltage (CV) relationship that provides linear phase shift through the hybrid 114 is not linear. Obtaining linear phase shift from a reflective termination requires that the termination reactance be matched to the tangent function of the linear varactor bias voltage variation. An abrupt junction varactor, with gamma ($\gamma$) of 0.5, is generally suitable for matching to the tangent function, over a limited bias voltage range. With a subharmonic reference signal in the range of 3 to 5 GHz, the required minimum varactor capacitance becomes comparable to the varactor parasitic package capacitance. The result of this is a flattening of the CV characteristic and the termination reactance characteristic as a function of increasing bias voltage. With this situation, the abrupt junction varactor, with $\gamma=0.5$, no longer provides a good match to the tangent function, resulting in poor phase shift linearity. Using an available hyperabrupt junction varactor for the diodes 120, 121, with $\gamma=0.75$, a near optimal match to the tangent function is obtained over a limited phase shift range, when a suitable series inductor 140, 142 is used, for a subharmonic reference signal of 3.6 GHz.

The fractional CPM signal at the output 122 of the reflection phase shifter 110 is fed to a field effect transistor (FET) frequency/phase multiplier 112. The frequency/phase multiplier 112 translates the modulated subharmonic reference signal to the desired carrier frequency and restores the full 360 degree phase shift range. The multiplier 112 consists of a GaAs FET 126, input and output matching circuitry 128, 130, output harmonic termination circuitry 132, and biasing circuitry (not shown, but various implementations may be used as is known to a skilled person in the art). The FET 126 is biased strongly Class C to obtain a conduction angle at the gate that maximizes the 5th harmonic. Input and output matching circuitry 128, 130 should be designed to provide simultaneous conjugate match at 3.6 GHz on the input and 18 GHz on the output. A simple coupled line bandpass filter (BPF) 132 is provided on the output to reject all unwanted spurious harmonic signals. More complicated harmonic termination circuitry on the FET input and output could also be used but was unnecessary for the sample implementation.

The input matching circuitry 128 is preferably implemented using microstrip as shown in FIG. 5, and is provided to conjugately match the phase shifter output impedance to the low input gate impedance of the FET 126 at the subharmoriic reference frequency. The input impedance of the FET 126 is essentially reactive, which makes wideband input matching very difficult. The effect of mismatch at the FET gate 146 is a variation in gate signal level. This, together with non-constant phase shifter output impedance as a function of control voltage causes a variation in the FET conduction angle. The harmonic output level in high harmonic FET multipliers is fairly sensitive to conduction angle, so significant amplitude modulation (AM) can be a result in the output CPM signal if this input matching is poor. This effect is offset by the increase in effective output bandwidth by a factor of xN as a result of frequency multiplication, so a narrowband subharmonic gate match is generally acceptable.

The multiplication factor for the sample implementation is x5. If multiplication factors greater than x7 are required, an additional frequency multiplier 150, constructed as the multiplier 112 with a Class C biased FET stage 126, along with interstage matching and harmonic termination circuitry, can be added as shown in FIG. 6. The gate 146 of the FET 126 is biased for a realistic conduction angle that maximizes the 5th harmonic output level (about 140 degrees). The gate bias and the FET input signal level should be carefully selected according to known techniques to provide unconditional stability at all subharmonics of the output carrier frequency. If the combination of gate bias and input signal amplitude pulls the peak gate voltage too far below the gate threshold voltage, the transistor becomes conditionally stable at subharmonic frequencies of the output, and is very difficult to terminate. The input and output microstrip matching networks 128 and 130 should be designed to provide simultaneous conjugate matching to the FET at 3.6 GHz on the input and 18 GHz on the output in the exemplary implementation. A 2nd order coupled line bandpass filter (BPF) 132 is used on the output of the matching network 130 to select the desired CPM carrier signal and reject all unwanted spurious harmonic signals. The filter rejection is adequate to maintain all spurious harmonic output signals at below −30 dBc. The CPM carrier signal 148 with 360 degree linear phase modulation range is output from the FET multiplier 112 at a level of approximately −30 dBm.

Using this novel hardware architecture, a sample circuit was designed at 18 GHz using microstrip as is shown for example at 134 in FIG. 5 for a sample 360 degree linear phase shifter implementation at 18 GHz, on a 25 mil thick Alumina substrate (not shown) with $\epsilon r=9.8$ and metal thickness of 0.15 mil. Hyperabrupt, GaAs chip varactors 120, 121, with $\gamma=0.75$, $C_{max}=2.4$ pF, and parasitic package capacitance of $C_p=0.15$ pF, were used in the fractional phase shifter reactive terminations 136, 138 along with 3.5 nH of series inductance. A general purpose medium power GaAs FET 126 was used in the frequency/phase multiplier section.

The circuit provided a total phase shift range of 425 degrees, for a varactor reverse bias voltage range of 1.3 to 11.8 V. Residual amplitude modulation (AM) is within 0.15 dB over the same bias range. A linear phase shift range of 370 degrees at 18 GHz was obtained within ±1 degree, for a varactor reverse bias voltage range of 1.4 to 10.5 V. The output bandwidth at 18 GHz is 200 MHz, with amplitude and phase distortion within 0.5 dB and 5 degrees, respectively, across the band. All output harmonic spurious signals are below −30 dBc, and the circuit conversion loss is approximately 18 dB.

While a preferred implementation has been described, the invention is not limited to the exemplary features described. A person skilled in the art will appreciate that immaterial variations are intended to be encompassed within the scope of the invention.

TABLE 1

| Current Output Phase Trajectory | Input Data 0 | Input Data 1 | Current Sawtooth Waveform |
|---|---|---|---|
| $0 \to \pi/2$ | $\pi/2 \to 0$ | $\pi/2 \to \pi$ | ① |
| $\pi/2 \to \pi$ | $\pi \to \pi/2$ | $\pi \to -\pi/2$ | ① |
| $\pi \to -\pi/2$ | $-\pi/2 \to \pi$ | $-\pi/2 \to 0$ | ④ |
| $-\pi/2 \to 0$ | $0 \to -\pi/2$ | $0 \to \pi/2$ | ④ |
| $0 \to -\pi/2$ | $-\pi/2 \to \pi$ | $-\pi/2 \to 0$ | ② |
| $-\pi/2 \to \pi$ | $\pi \to \pi/2$ | $\pi \to -\pi/2$ | ② |
| $\pi \to \pi/2$ | $\pi/2 \to 0$ | $\pi/2 \to \pi$ | ③ |
| $\pi/2 \to 0$ | $0 \to -\pi/2$ | $0 \to \pi/2$ | ③ |
|  | CW | CCW |  |
|  | Next Output Phase Trajectory | | |

CW - Clockwise
CCW - Counterclockwise

TABLE 2

| Order | $c_7$ | $c_6$ | $c_5$ | $c_4$ | $c_3$ | $c_2$ | $c_1$ | $c_0$ |
|---|---|---|---|---|---|---|---|---|
| 2 |  |  |  |  |  |  | 1.000 | 1.553 |
| 3 |  |  |  |  |  | 1.000 | 2.517 | 2.419 |
| 4 |  |  |  |  | 1.000 | 3.585 | 5.428 | 4.032 |
| 5 |  |  |  | 1.000 | 4.748 | 10.021 | 11.572 | 7.223 |
| 6 |  |  | 1.000 | 5.996 | 16.480 | 26.234 | 25.257 | 13.831 |
| 7 |  | 1.000 | 7.326 | 25.087 | 51.506 | 67.890 | 57.051 | 28.138 |
| 8 | 1.000 | 8.732 | 36.122 | 91.654 | 154.87 | 177.37 | 133.76 | 60.472 |

TABLE 3

| Order | $g_0$ | $g_1$ | $g_2$ | $g_3$ | $g_4$ |
|---|---|---|---|---|---|
| 2 | 1.000 | 0.121 | 1.000 |  |  |
| 3 | 1.000 | 0.145 | 5.01e-2 | 1.000 |  |
| 4 | 1.000 | 0.109 | 0.109 | 3.44e-2 | 1.000 |

TABLE 4

| $BT_b$ | Order | Divider (M) | Bandwidth ($|\Delta f_i T_b|$) |
|---|---|---|---|
| 0.2 | 2 | 2 | 0.309 |
|  | 3 | 3 | 0.365 |
|  | 4 | 3 | 0.310 |
| 0.3* | 2 | 2 | 0.464 |
|  | 3 | 2 | 0.365 |
|  | 4 | 2 | 0.310 |
| 0.4 | 2 | 1 | 0.309 |
|  | 3 | 2 | 0.486 |
|  | 4 | 2 | 0.412 |
| 0.5 | 2 | 1 | 0.387 |
|  | 3 | 1 | 0.304 |
|  | 4 | 1 | 0.258 |
| 0.6 | 2 | 1 | 0.464 |
|  | 3 | 1 | 0.365 |
|  | 4 | 1 | 0.310 |
| 0.7 | 2 | 1 | 0.541 |
|  | 3 | 1 | 0.426 |
|  | 4 | 1 | 0.361 |

TABLE 5

| Current Output Phase Trajectory | | Input Data 0 | | Input Data 1 | | Current Sawtooth Waveform |
|---|---|---|---|---|---|---|
| $0 \to \pi/4$ | A | $\pi/4 \to 0$ | B | $\pi/4 \to \pi/2$ | A | ① |
| $\pi/4 \to \pi/2$ | A | $\pi/2 \to \pi/4$ | A | $\pi/2 \to 3\pi/4$ | A | ① |
| $\pi/2 \to 3\pi/4$ | A | $3\pi/4 \to \pi/2$ | B | $3\pi/4 \to \pi$ | A | ① |
| $3\pi/4 \to \pi$ | A | $\pi \to 3\pi/4$ | A | $\pi \to -3\pi/4$ | A | ① |
| $\pi \to -3\pi/4$ | A | $-3\pi/4 \to \pi$ | B | $-3\pi/4 \to -\pi/2$ | A | ⑤ |
| $-3\pi/4 \to -\pi/2$ | A | $-\pi/2 \to -3\pi/4$ | A | $-\pi/2 \to -\pi/4$ | A | ⑤ |
| $-\pi/2 \to -\pi/4$ | A | $-\pi/4 \to -\pi/2$ | B | $-\pi/4 \to 0$ | A | ⑤ |
| $-\pi/4 \to 0$ | A | $0 \to -\pi/4$ | A | $0 \to \pi/4$ | A | ⑤ |
| $0 \to -\pi/4$ | A | $-\pi/4 \to -\pi/2$ | A | $-\pi/4 \to 0$ | B | ⑦ |
| $-\pi/4 \to -\pi/2$ | A | $-\pi/2 \to -3\pi/4$ | A | $-\pi/2 \to -\pi/4$ | A | ⑦ |
| $-\pi/2 \to -3\pi/4$ | A | $-3\pi/4 \to \pi$ | A | $-3\pi/4 \to -\pi/2$ | B | ⑦ |
| $-3\pi/4 \to \pi$ | A | $\pi \to 3\pi/4$ | A | $\pi \to -3\pi/4$ | A | ⑦ |
| $\pi \to 3\pi/4$ | A | $3\pi/4 \to \pi/2$ | A | $3\pi/4 \to \pi$ | B | ③ |

TABLE 5-continued

| Current Output Phase Trajectory | Input Data 0 | | Input Data 1 | | Current Sawtooth Waveform |
|---|---|---|---|---|---|
| 3π/4 → π/2 | A | π/2 → π/4 | A | π/2 → 3π/4 | A | ③ |
| π/2 → π/4 | A | π/4 → 0 | A | π/4 → π/2 | B | ③ |
| π/4 → 0 | A | 0 → -π/4 | A | 0 → π/4 | A | ③ |
| 0 → π/4 | B | π/4 → 0 | A | π/4 → π/2 | B | ② |
| π/4 → π/2 | B | π/2 → π/4 | B | π/2 → 3π/4 | B | ② |
| π/2 → 3π/4 | B | 3π/4 → π/2 | A | 3π/4 → π | B | ② |
| 3π/4 → π | B | π → 3π/4 | B | π → -3π/4 | B | ② |
| π → -3π/4 | B | -3π/4 → π | A | -3π/4 → -π/2 | B | ⑥ |
| -3π/4 → -π/2 | B | -π/2 → -3π/4 | B | -π/2 → -π/4 | B | ⑥ |
| -π/2 → -π/4 | B | -π/4 → -π/2 | A | -π/4 → 0 | B | ⑥ |
| -π/4 → 0 | B | 0 → -π/4 | B | 0 → π/4 | B | ⑥ |
| 0 → -π/4 | B | -π/4 → -π/2 | B | -π/4 → 0 | A | ⑧ |
| -π/4 → -π/2 | B | -π/2 → -3π/4 | B | -π/2 → -π/4 | B | ⑧ |
| -π/2 → -3π/4 | B | -3π/4 → π | B | -3π/4 → -π/4 | A | ⑧ |
| -3π/4 → π | B | π → 3π/4 | B | π → -3π/4 | B | ⑧ |
| π → 3π/4 | B | 3π/4 → π/2 | B | 3π/4 → π | A | ④ |
| 3π/4 → π/2 | B | π/2 → π/4 | B | π/2 → 3π/4 | B | ④ |
| π/2 → π/4 | B | π/4 → 0 | B | π/4 → π/2 | A | ④ |
| π/4 → 0 | B | 0 → -π/4 CW | B | 0 → π/4 CCW | B | ④ |
| | | Next Output Phase Trajectory | | | |

CW - Clockwise
CCW - Counterclockwise
Initialize (t = 0)

The embodiments of the invention in which an exclusive property or privilege is claimed are defined as follows:

1. A modulator, comprising:
   a source of a continuous phase modulated signal, in which the continuous phase modulated signal carries a baseband information signal;
   a voltage controlled oscillator having an oscillator output and a voltage control port;
   a coupler on the oscillator output; and
   a phase difference detector having a first input connected to the source of a continuous phase modulated signal, a second input connected to the coupler to form a feedback path and an output connected to supply a voltage error signal to the voltage control port, whereby the voltage controlled oscillator, the coupler and the phase difference detector form a phase locked loop and wherein the voltage error signal has a voltage proportional to an instantaneous phase difference between the continuous phase modulated signal and a signal appearing at the oscillator output.

2. The modulator of claim 1 further comprising:
   a filter in the phase locked loop for spectral shaping of the oscillator output signal to a pre-determined frequency spectrum.

3. The modulator of claim 2 wherein the predetermined frequency spectrum is a Gaussian minimum shift keying spectrum.

4. The modulator of claim 2 in which the filter is a low pass filter having a filter response represented by a polynomial function having only poles.

5. The modulator of claim 1 in which the modulator has a modulation index of 0.5.

6. The modulator of claim 1 in which the source of a continuous phase modulated signal comprises:
   a voltage controlled phase shifter having a reference signal input, a control voltage input and being connected to supply a continuous phase modulated signal to the phase locked loop; and
   a baseband modulation generator connected to supply control voltage to the control voltage input of the voltage controlled phase shifter.

7. The modulator of claim 6 in which the reference signal input is connected to a frequency source with output frequency that is at a sub-harmonic of the continuous phase modulated signal and the voltage controlled phase shifter comprises:
   a continuous phase modulator connected to receive the sub-harmonic reference signal as input and having an output; and
   a frequency multiplier for increasing the frequency and phase shift of the output from the continuous phase modulator.

8. The modulator of claim 6 in which the baseband modulation generator comprises means to integrate a baseband binary input signal.

9. The modulator of claim 1 further comprising a frequency divider in the feedback path of the phase locked loop.

10. A Gaussian minimum shift keying modulator for providing direct and efficient modulation of a microwave carrier signal, the modulator comprising:
    a linear 360 degree continuous phase modulator that is controllable by a linear modulation signal to provide continuous phase frequency shift keying modulation of a carrier signal at a subharmonic frequency of a desired output frequency, and output a continuous phase frequency shift keying modulated signal, with a modulation index of 0.5, at the desired output frequency;
    a voltage controlled oscillator having a voltage control port and an oscillator output;
    a phase locked loop configured for providing a baseband error signal to the voltage control port of the voltage controlled oscillator, whereby the voltage controlled oscillator may track the frequency of the same frequency continuous phase frequency shift keying modulated signal, with a modulation index of 0.5, while imposing a filtering characteristic on the baseband error signal that shapes the voltage controlled oscillator modulated output signal to have a spectrum corresponding to a Gaussian minimum shift keying modulated signal spectrum; and
    a baseband modulation signal generator having means to integrate an input baseband binary information signal and to supply the integrated signal as a modulating signal in the continuous phase modulator.

11. The Gaussian minimum shift keying modulator of claim 10 further comprising a coupler on the oscillator output connected to direct a sample of the voltage controlled oscillator modulated output signal along a feedback path to the phase locked loop to stabilise the voltage controlled oscillator modulated output signal frequency and shape the voltage controlled oscillator modulated output signal spectrum to have a spectrum of a Gaussian minimum shift keying modulated signal.

12. The Gaussian minimum shift keying modulator of claim 11 in which the phase locked loop comprises a baseband lowpass filter having a response corresponding to a desired Gaussian filter response approximation modified to account for filter characteristics of the phase locked loop.

13. The Gaussian minimum shift keying modulator of claim 11 further comprising a frequency divider in the feedback path of the phase lock loop for dividing the oscillator output frequency by an integer value M.

14. The modulator of claim 11 in which the input baseband binary information signal has a bit period and the baseband modulation signal generator comprises:

means to generate the integrated baseband signal as a function of four different sawtooth waveforms, each having a period of two times the input baseband binary information signal bit period, and each representing a different phase trajectory of $\pi$ radians in the phase of the continuous pbase frequency shift keying modulated signal.

15. The modulator of claim 14 in which the baseband modulation signal generator further comprises means for independently controlling the slopes of the four sawtooth waveforms.

16. The modulator of claim 14 in which the baseband modulation signal generator further comprises a multiplexer for multiplexing the integrated signal as a function of eight different waveforms sampled from the four different sawtooth waveforms at the baseband binary information signal bit period, where each modulation signal represents a different phase trajectory of $\pi/2$ radians in the phase of the continuous phase frequency shift keying modulated output.

17. The modulator of claim 16 in which the baseband modulation signal generator further comprises:

a clocked synchronous finite state machine having means for storing output signal phase trajectory and controlling the multiplexer to select one of the eight different waveforms based on the value of the next input baseband binary information signal bit.

18. The modulator of claim 14 in which phase discontinuity in the output modulated signal at the $\pm\pi$ radian boundary is accounted for in the baseband modulation signal with a voltage step discontinuity from $V_{max}$ to $V_{min}$, resulting in change of phase state in the output modulated signal from $+\pi$ to $-\pi$ radians without significant instantaneous phase shift error.

19. The modulator of claim 11 in which the input baseband binary information signal has a bit period and the baseband modulation signal generator comprises:

means to generate the integrated baseband signal as a function of 4 M different sawtooth waveforms, each having a period of 2 M times the input baseband binary information signal bit period, and each representing a different phase trajectory of $\pi$ radians in the phase of the continuous phase frequency shift keying modulated signal.

20. The modulator of claim 19 in which the baseband modulation signal generator further comprises means for independently controlling the slopes of the 4 M sawtooth waveforms.

21. The modulator of claim 19 in which the baseband modulation signal generator further comprises a multiplexer for multiplexing the integrated signal as a function of 8 M different waveforms sampled from the 4 M different sawtooth waveforms at the baseband binary information signal bit period, where each modulation signal represents a different phase trajectory of $\pi/2$ M radians in the phase of the continuous phase frequency shift keying modulated output.

22. The modulator of claim 21 in which the baseband modulation signal generator further comprises:

a clocked synchronous finite state machine having means for storing output signal phase trajectory and for controlling the multiplexer to select one of the 8 M different waveforms based on the value of the next input baseband binary information signal bit.

* * * * *